United States Patent
Seager

(10) Patent No.: US 9,919,446 B2
(45) Date of Patent: *Mar. 20, 2018

(54) WEIGHT GIVEAWAY REDUCTION SYSTEM

(75) Inventor: Richard David Seager, Norwich (GB)

(73) Assignee: Thurne-Middleby Ltd (GB)

( * ) Notice: Subject to any disclaimer, the term of this patent is extended or adjusted under 35 U.S.C. 154(b) by 1890 days.

This patent is subject to a terminal disclaimer.

(21) Appl. No.: 12/100,451

(22) Filed: Apr. 10, 2008

(65) Prior Publication Data

US 2008/0250904 A1 Oct. 16, 2008

(30) Foreign Application Priority Data

Apr. 13, 2007 (GB) .................................. 0707153.3

(51) Int. Cl.
| | | |
|---|---|---|
| A22C 17/00 | (2006.01) | |
| B26D 7/00 | (2006.01) | |
| B26D 7/30 | (2006.01) | |
| B26D 7/32 | (2006.01) | |
| G01G 15/02 | (2006.01) | |

(Continued)

(52) U.S. Cl.
CPC ............... B26D 7/30 (2013.01); B26D 7/32 (2013.01); G01G 15/02 (2013.01); G01G 19/306 (2013.01); G01G 19/384 (2013.01); B26D 5/00 (2013.01); B26D 2210/02 (2013.01);

(Continued)

(58) Field of Classification Search
CPC ... B26D 7/30; B26D 5/00; B26D 7/32; B26D 2210/02; A22C 17/0033; G01G 15/02; G01G 15/04; G01G 19/306; G01G 19/384; Y10T 83/0538; Y10T 83/145;

(Continued)

(56) References Cited

U.S. PATENT DOCUMENTS 3,995,517 A 12/1976 Smith
4,065,911 A 1/1978 Fagan
(Continued)

FOREIGN PATENT DOCUMENTS

EP 0127462 A1 12/1984
EP 0246668 A2 11/1987
(Continued)

OTHER PUBLICATIONS

UK Search Reports.
(Continued)

*Primary Examiner* — Clark F Dexter
(74) *Attorney, Agent, or Firm* — Barnes & Thornburg LLP

(57) ABSTRACT

A food processing system includes a food slicing machine having a control arrangement for regulating a thickness of slices cut by the machine so that they are cut according to a current value of a slice size parameter. An under-weight signal is generated which is responsive to generation of any under-weight groups of slices by the slicing machine, and an end-of-line weighing device monitors the weight of groups of slices outputted by the system and generates an end-of-line weight signal responsive thereto. The system identifies any under-weight groups of slices so that their weight can be increased by addition of a further slice before being outputted by the system. The control arrangement receives the two signals and determines the value of the slice size parameter having regard to them. The slice size parameter may be adjusted to minimize give-away by the system.

4 Claims, 1 Drawing Sheet

(51) Int. Cl.
  *G01G 19/30* (2006.01)
  *G01G 19/38* (2006.01)
  *B26D 5/00* (2006.01)

(52) U.S. Cl.
  CPC .......... *Y10T 83/0405* (2015.04); *Y10T 83/145* (2015.04); *Y10T 83/155* (2015.04); *Y10T 83/162* (2015.04)

(58) Field of Classification Search
  CPC ... Y10T 83/148; Y10T 83/155; Y10T 83/162; Y10T 83/173; Y10T 83/182
  USPC .............. 83/77, 42, 73, 74, 75.5, 76.1, 76.6
  See application file for complete search history.

(56) References Cited

U.S. PATENT DOCUMENTS

| | | |
|---|---|---|
| 4,100,984 A | 7/1978 | Klopfenstein et al. |
| 4,216,698 A | 8/1980 | Chiabrandy |
| 4,794,996 A | 1/1989 | Wallace et al. |
| 5,109,936 A | 5/1992 | Ruppel |
| 5,499,719 A | 3/1996 | Lindee et al. |
| 5,890,342 A * | 4/1999 | McDonald et al. ..... B26D 7/30 53/502 |
| 6,320,141 B1 | 11/2001 | Lindee et al. |

FOREIGN PATENT DOCUMENTS

| | | |
|---|---|---|
| GB | 1553087 | 9/1979 |
| GB | 2173008 A | 10/1986 |
| WO | WO-84/01927 A1 | 5/1984 |
| WO | WO-2004/106020 A1 | 12/2004 |

OTHER PUBLICATIONS

DEI, Die Ernahrungs Industrie, Das Proxismagazin Fur Die Lebensmittelproduktion, pp. 1, 42, 43 and 63, Apr. 2007.
English translation of pp. 42 and 43 of DEI, Die Ernahrungs Industrie, Das Proxismagazin Fur Die Lebensmittelproduktion, Apr. 2007.

* cited by examiner

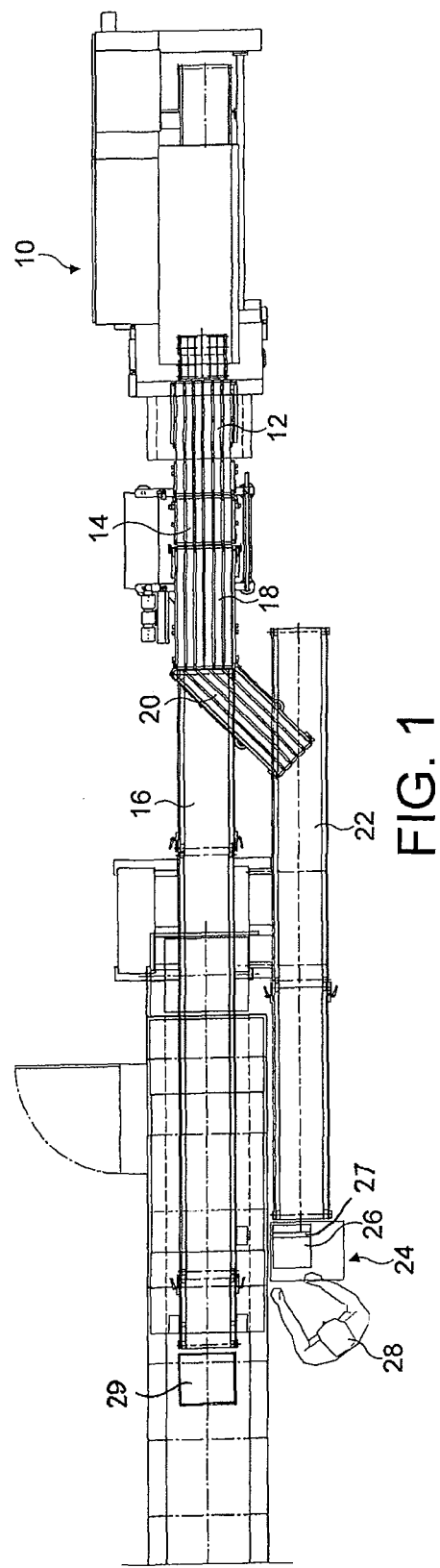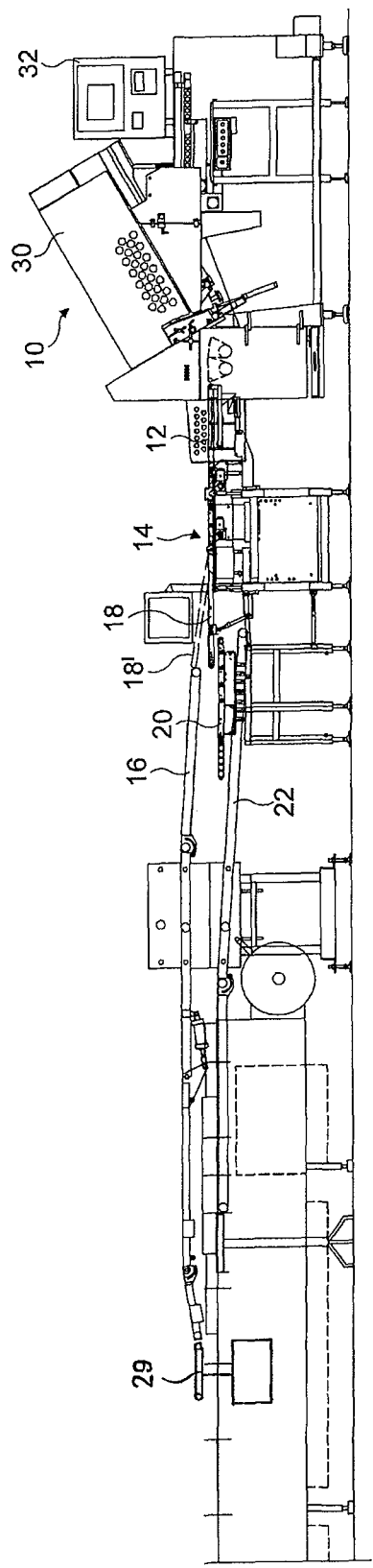

WEIGHT GIVEAWAY REDUCTION SYSTEM

FIELD OF THE INVENTION

The present invention relates to systems for slicing food products (such as bacon, cheese or cooked meat). More particularly, it relates to systems configured to output groups of slices for sale in separate packs, with each group having a weight greater than a predetermined group weight threshold.

BACKGROUND TO THE INVENTION

Increasingly, food retailers and supermarkets in particular require suppliers to provide packs of sliced food products of standard weights. Labelling regulations may permit some deviation from the standard weights indicated on packs but only within narrow tolerances.

It is therefore desirable for food suppliers to aim to provide packs which just meet the associated weight requirements, minimising the extent to which any minimum requirement is exceeded. Any such excess food product included in a pack is often referred to as "give-away".

In view of the pressure to just satisfy a minimum requirement, groups of slices are occasionally generated by a slicing machine which are slightly below this minimum threshold. In known processing arrangements, these "under-weight" groups are diverted out of the path to the packaging process and to a separate station, sometimes referred to as the "make-weight" station. An operator at the make-weight station adds an additional slice to each under-weight group of slices and then returns the group made up to an acceptable weight with the additional slice into the path to the packaging process.

This process tends to increase give-away, as under-weight packs are likely to fall short of the minimum threshold by an amount less than the weight of an entire additional slice. For example, a slice of bacon may typically weigh 20 g. If an under-weight group of slices only falls short by 2 g, the under-weight group together with an additional slice created at the make-weight station will include a give-away of 18 g. Given the large number of under-weight packs likely to be generated by a processor having a high throughput of food packs, the cumulative give-away is substantial and therefore costly.

A food slicing machine is typically configured to cut each slice from a log of food product according to the current value of a slice size parameter, often referred to as the slicer "set point". If this parameter is set too low, the make-weight station becomes inundated with under-weight groups of slices and the operator at the make-weight station can become overwhelmed. If the parameter is set too high, the amount of give-away increases, making the process less cost efficient.

The physical properties of food products can vary in stability depending on the type of food product to be sliced. A relatively homogeneous product such as cheese has reasonably consistent properties, whereas the properties of a less consistent, naturally formed product such as bacon can vary significantly depending on a number of variables, such as the lean-to-fat ratio, the temperature of the food product, its brine content and the like. When slicing this type of product, the optimum set point can vary from day to day and during the course of each day. Careful monitoring and control of the set point is therefore desirable to maximise the efficiency of the system during operation.

SUMMARY OF THE INVENTION

The present invention provides a food processing system for outputting groups of slices of a food product with each group having a weight greater than a predetermined group weight threshold, including:
a food slicing machine having a control arrangement for regulating the thickness of the slices cut buy the machine so that the machine cuts slices according to the current value of a slice size parameter;
an under-weight signal generating apparatus responsive to the generation of any groups of slices by the slicing machine having a weight less than the predetermined group weight threshold; and
an end-of-line weighing arrangement at an end-of-line position for monitoring the weight of groups of slices outputted by the system and generating an end-of-line weight signal responsive thereto,
wherein the system is arranged to identify any under-weight groups of slices so that their weight can be increased by the addition of a further slice before being outputted by the system, and the control arrangement is arranged to receive the end-of-line weight signal and the under-weight signal and to determine the value of the slice size parameter having regard to these signals, such that the value tends towards an optimal value of the slicing parameter to minimise give-away at the end-of-line position.

The slice size parameter may be slice thickness, or slice volume or weight. Where a log of food product has a variable cross-section, the slicing machine may include means for determining the area of the end face at the end of the food product being cut. This then enables the slice thickness to be calculated which generates a slice having the desired slice volume or weight.

Whilst monitoring the output of an end-of-line weighing arrangement alone would give an indication of the rate of food give-away, the inventor has realised that this signal would not take into account the influence of the make-weight function. As a make-weight function will tend to generate groups including a significant amount of give-away due to the coarseness of the "topping up" process carried out at the make-weight station, generation of an increasing number of under-weight groups will tend to create a vicious circle, leading to overloading of the make-weight station.

As an increasing rate of groups is fed to the make-weight station, the amount of give-away will increase as these groups are fed back into the path to the packing station, past the end-of-line weighing arrangement. The end-of-line weighing arrangement will indicate the amount of give-away is increasing and therefore indicate that the slicing set point should be reduced. This will only increase the number of groups being sliced which are under-weight and therefore having to be diverted to the make-weight station.

To address this problem, in a system according to the present invention, the slicing machine control arrangement is responsive not only to the end-of-line weight signal, but also an under-weight signal which is related to the generation of under-weight groups of slices.

Using feedback signals in this manner, the control arrangement is able to incrementally increase or decrease the current value of the slice size parameter (the set point) so as to reduce the amount of give-away by tending towards an optimum set point for the current operating conditions of the slicing machine and current properties of the food product being sliced, without inundating a make-weight function.

In a preferred embodiment of the invention, the under-weight signal generating apparatus includes an input device for use by an operator at a make-weight station, having regard to the weight of an under-weight group or groups of slices received at the make-weight station and/or the rate at which such groups are arriving at the make-weight station.

In another preferred embodiment, the under-weight signal generating apparatus is a check-weight weighing arrangement, which monitors the weight of the groups of slices generated by the slicing machine. The under-weight signal is responsive to the weights of under-weight groups of slices measured by the check-weight weighing arrangement. In this way, generation of the under-weight signal may be automated.

The under-weight signal may represent the respective weights of individual groups of under-weight slices. Alternatively, it may be related in a more general way to the weight of under-weight groups. For example, the under-weight signal may be indicative of the rate of production of under-weight groups of slices by the slicing machine.

Preferably, the system includes a separating arrangement for separating groups of slices outputted by the slicing machine which have a weight less than the predetermined group weight threshold from groups of slices outputted by the slicing machine which have a weight greater than or equal to the predetermined group weight threshold; and a make-weight weighing arrangement for measuring the weight of a separated group of slices which has a weight less than the predetermined group weight threshold, wherein the under-weight signal generating apparatus is the make-weight weighing arrangement and the under-weight signal generating apparatus is responsive to the weights of groups of slices measured by the make-weight weighing arrangement.

The present invention further provides a food slicing machine for outputting groups of slices of a food product with each group having a weight greater than a predetermined group weight threshold, including a control arrangement for regulating the thickness of the slices cut by the machine so that the machine cuts slices according to the current value of a slice size parameter, wherein the control arrangement is arranged to receive an under-weight rate signal responsive to the rate of production of groups of slices by the slicing machine which have a weight less than the predetermined group weight threshold and to determine the current value of the slice size parameter having regard to this signal.

The inventor has realised that the rate of production of under-weight groups of slices, which provides a good indication of how efficiently the slicing system is operating, can be employed by a controller to adjust the slicing set point of the slicing machine.

In a preferred embodiment, the under-weight rate signal is generated by the check-weight weighing arrangement, which monitors the weight of groups of slices outputted by the slicing machine. It will though be appreciated that the rate of production of groups of under-weight slices may be detected at various locations in the system.

The control arrangement may be operable to determine the current value of the slicing set point having regard to the under-weight rate signal in such a way that the under-weight rate signal tends towards a predetermined value. In some cases, it may be preferable for this predetermined value to be greater than zero, with optimal control of the system to minimise give-away involving a limited rate of generation of under-weight groups of slices.

According to a further aspect, the invention provides a method of slicing a food product using a food processing system including a food slicing machine, comprising the steps of:
  cutting slices according to the first value of a slice size parameter;
  receiving an end-of-line signal which is responsive to the weight of groups of slices outputted by the system;
  receiving an under-weight signal which is responsive to the generation of any groups of slices by the slicing machine having a weight less than a predetermined group weight threshold; and
  determining a second value of the slice size parameter having regard to these signals, wherein the second value is calculated such that the slice size parameter tends towards an optimal value to minimise give-away.

In addition, the invention also provides a method of slicing a food product using a food slicing machine, comprising the steps of cutting slices according to a first value of a slice size parameter; receiving an under-weight rate signal responsive to the rate of production of groups of slices by the slicing machine which have a weight less than a predetermined group weight threshold; and determining a second value of the slice size parameter having regard to the under-weight rate signal.

BRIEF DESCRIPTION OF THE DRAWINGS

Embodiments of the invention will now be described by way of example and with reference to the accompanying schematic drawings, wherein:
FIG. 1 shows a plan view of a food processing system according to an embodiment of the invention; and
FIG. 2 is a side view of the system shown in FIG. 1.

DETAILED DESCRIPTION

The system shown in FIGS. 1 and 2 includes a food slicing machine 10 which outputs slices of a food product onto conveyor 12. This in turn feeds groups of slices through a weighing station 14, also referred to as a check-weight station 14.

Groups of slices which are detected by the check-weight station 14 as meeting predetermined weight requirements are passed on to an "on-weight" conveyor 16 by a pivotable section of conveyor 18. Alternatively, groups of slices which fall outside the predetermined weight requirements are diverted by pivotable conveyor 18 and angled conveyor 20 on to an "off-weight" conveyor 22.

In FIG. 2, pivotable conveyor 18 is shown in a lowered orientation, which diverts groups of slices towards the off-weight conveyor 22. Its alternative orientation in which groups of slices continue on to the on-weight conveyor 16 is shown by dashed lines (18').

Groups of slices travelling down the on-weight conveyor 16 are carried to a packaging station (not shown) for sealing into respective packs. Groups of slices diverted on to the off-weight conveyor 22 are carried down to a make-weight station 24 which includes a set of weighing scales 26.

Slicing machine 10 includes an inclined loading bed within a housing 30 for supporting a log of food product to be sliced. The log is fed towards a rotating slicing blade (not shown) located at the lower end of the loading bed. A control arrangement 32 is programmable to control the operation of the slicing machine. It includes a display and control panel to enable an operator to monitor its operation and enter commands as appropriate.

A gripper (not shown) engages the trailing end of the food product and feeds it towards the slicing blade. The distance by which the product is fed past the blade determines the slice thickness.

The slicer may be programmed to slice a given food product at a given "set point". This set point is a parameter relating to the size of the slices to be cut. It may, for example, represent a desired slice thickness. Alternatively, in a system able to measure the cross-sectional area of the end face of the food product which is being cut, the set point may represent a desired slice volume or weight. On the basis of the measured cross-sectional area, the control arrangement 32 determines the slice thickness needed to achieve the set point volume or weight and controls the slicer accordingly.

In the embodiment of the invention shown in FIGS. 1 and 2, the weighing scales 26 at the make-weight station include a control panel 27 for use by an operator 28. Using the scales, the operator is able to determine how far below the desired weight the off-weight groups of slices received are. The operator can then use the control panel 27 to indicate the shortfall of individual off-weight groups. Alternatively, the operator may indicate via the control panel 27 that the rate of generation of off-weight groups is too high or too low and/or the current set point should be increased or decreased.

On-weight conveyor 16 carries groups of slices past the make-weight station 24, towards an end-of-line weighing arrangement 29, wherein the structure per se of the weighing arrangement 29 is known in the art. This weighing arrangement is therefore able to weigh slices carried directly to it by the on-weight conveyor 16, and also groups of slices that have been "topped-up" and placed onto the on-weight conveyor 16 by the operator at the make-weight station 24. The end-of-line weighing arrangement 29 may monitor the weight of groups of slices before or after they have been individually packaged.

The end-of-line weighing arrangement 29 is communicatively coupled to the control arrangement 32 to enable transmission of an end-of-line weight signal from the end-of-line weighing arrangement thereto. The check-weight station 14 and weighing scales 26 are similarly coupled to the control arrangement for feeding back respective signals.

The control arrangement 32 is programmed to determine the value of the slice size parameter (set point) having regard to the signals it receives with a view to minimising the amount of give-away generated by the system.

It will be appreciated that operations carried out at the make-weight station 24 could be automated to a greater extent, for example by the use of one or more robotic arms (not shown) to manipulate individual slices or groups of slices to create on-weight groups and place them onto the on-weight conveyor 16. Furthermore, in an alternative configuration, under-weight groups could remain on the conveyor 16 and be "topped up" by a robotic arm or arms which transfer an additional slice onto each under-weight group as it travels towards, or is located at, the packing station.

The invention claimed is:

1. A food processing system for outputting groups of slices of a food product with each group having a weight greater than a predetermined group weight threshold while minimising give-away for each group, including:
    a food slicing machine having a control arrangement for regulating a thickness of slices cut by the slicing machine so that the slicing machine cuts the slices according to a current value of a slice size parameter to form groups of slices;
    a check-weight weighing arrangement that receives the groups of slices from the food slicing machine and is responsive to generation of any under-weight group of slices cut by the slicing machine having a weight less than the predetermined group weight threshold by generating an under-weight signal corresponding to each of the under-weight groups of slices,
    wherein the system identifies the under-weight groups of slices via the under-weight signal so that the weight of the under-weight groups of slices can be increased by addition of a further slice to create a topped-up group of slices before being outputted by the system along with on-weight groups of slices, the on-weight groups of slices being groups of slices cut by the slicing machine having a weight equal to or greater than the predetermined group weight threshold; and
    an end-of-line weighing arrangement at an end-of-line position which
        (a) receives the topped-up groups of slices and the on-weight groups of slices,
        (b) monitors the weight of each of the topped-up groups of slices and the weight of each of the on-weight groups of slices, and
        (c) generates an end-of-line weight signal corresponding to each of the topped-up groups of slices and to each of the on-weight groups of slices;
    wherein the control arrangement:
        (a) receives
            (i) each end-of-line weight signal, each end-of-line weight signal corresponding to the weight of each of the topped-up groups of slices as well as to the weight of each of the on-weight groups of slices, and
            (ii) each under-weight signal; and
        (b) adjusts the slicing machine to change the thickness of the slices cut by the slicing machine so that the slicing machine cuts the slices according to a new value of the slice size parameter which is determined by the control arrangement based on both the end-of-line weight signals and the under-weight signals, such that the slice size parameter tends towards an optimal value of the slice size parameter to minimise give-away at the end-of-line position.

2. The system of claim 1 wherein the under-weight signals are indicative of the rate of production of groups of slices by the slicing machine which have a weight less than the predetermined group weight threshold.

3. The system of claim 1 further including:
    a separating arrangement that receives the groups of slices from the check-weight weighing arrangement for separating the under-weight groups of slices outputted by the slicing machine from the on-weight groups of slices outputted by the slicing machine; and
    a make-weight weighing arrangement for measuring the weight of each separated under-weight group of slices,
    wherein the control arrangement further receives a signal from the make-weight weighing arrangement for each under-weight group of slices, and
    wherein the adjustment of the slicing machine to change the thickness of the slices cut by the slicing machine so that the slicing machine cuts the slices according to the new value of the slice size parameter is determined by the control arrangement based on the end-of-line weight signals, the under-weight signals, and the signals from the make-weight weighing arrangement taken together, such that the slice size parameter tends towards an optimal value of the slice size parameter to minimise give-away at the end-of-line position.

4. The system of claim 3 wherein the make-weight weighing arrangement includes an input device for use by an operator.

* * * * *